United States Patent [19]

Takeda

[11] Patent Number: 5,063,447
[45] Date of Patent: Nov. 5, 1991

[54] INFORMATION PROCESSING APPARATUS HAVING A COMMON A/D CONVERTER FOR THE IMAGE AND AUDIO SIGNALS

[75] Inventor: Nobuhiro Takeda, Kawasaki, Japan

[73] Assignee: Canon Kabushiki Kaisha, Tokyo, Japan

[21] Appl. No.: 396,970

[22] Filed: Aug. 22, 1989

[30] Foreign Application Priority Data

Aug. 23, 1988 [JP] Japan .................. 63-207254

[51] Int. Cl.⁵ ........................................... H04N 7/093
[52] U.S. Cl. .................................... 358/145; 358/343; 358/909
[58] Field of Search ................ 358/142, 143, 144, 145, 358/341, 343, 909

[56] References Cited

U.S. PATENT DOCUMENTS

| | | | |
|---|---|---|---|
| 3,446,914 | 5/1969 | Hodge | 358/145 |
| 4,163,248 | 7/1979 | Heitmann | 358/14 |
| 4,442,461 | 4/1984 | Shirgi et al. | 358/343 |
| 4,514,760 | 4/1985 | Balaban et al. | 358/143 |
| 4,763,206 | 8/1988 | Takahashi et al. | 358/343 |
| 4,791,477 | 12/1988 | Blazek et al. | 358/341 |
| 4,851,909 | 7/1989 | Noska et al. | 358/143 |

Primary Examiner—John W. Shepperd
Attorney, Agent, or Firm—Fitzpatrick, Cella, Harper & Scinto

[57] ABSTRACT

An information processing apparatus having a common A/D converter for the image and audio signals includes image pickup circuitry for converting an image into an image signal. Preferably, the image pickup means has an effective period and an ineffective period (e.g. a horizontal blanking interval). Audio pickup circuitry is provided for converting sound into an audio signal. A common A/D converter is provided for A/D converting both the image signal and the audio signal. Preferably, the image signal is A/D converted during the effective image pickup period, and the audio signal is A/D converted during the effective image pickup period. Preferably, the A/D converter has different sampling frequencies for the image and audio signals.

15 Claims, 4 Drawing Sheets

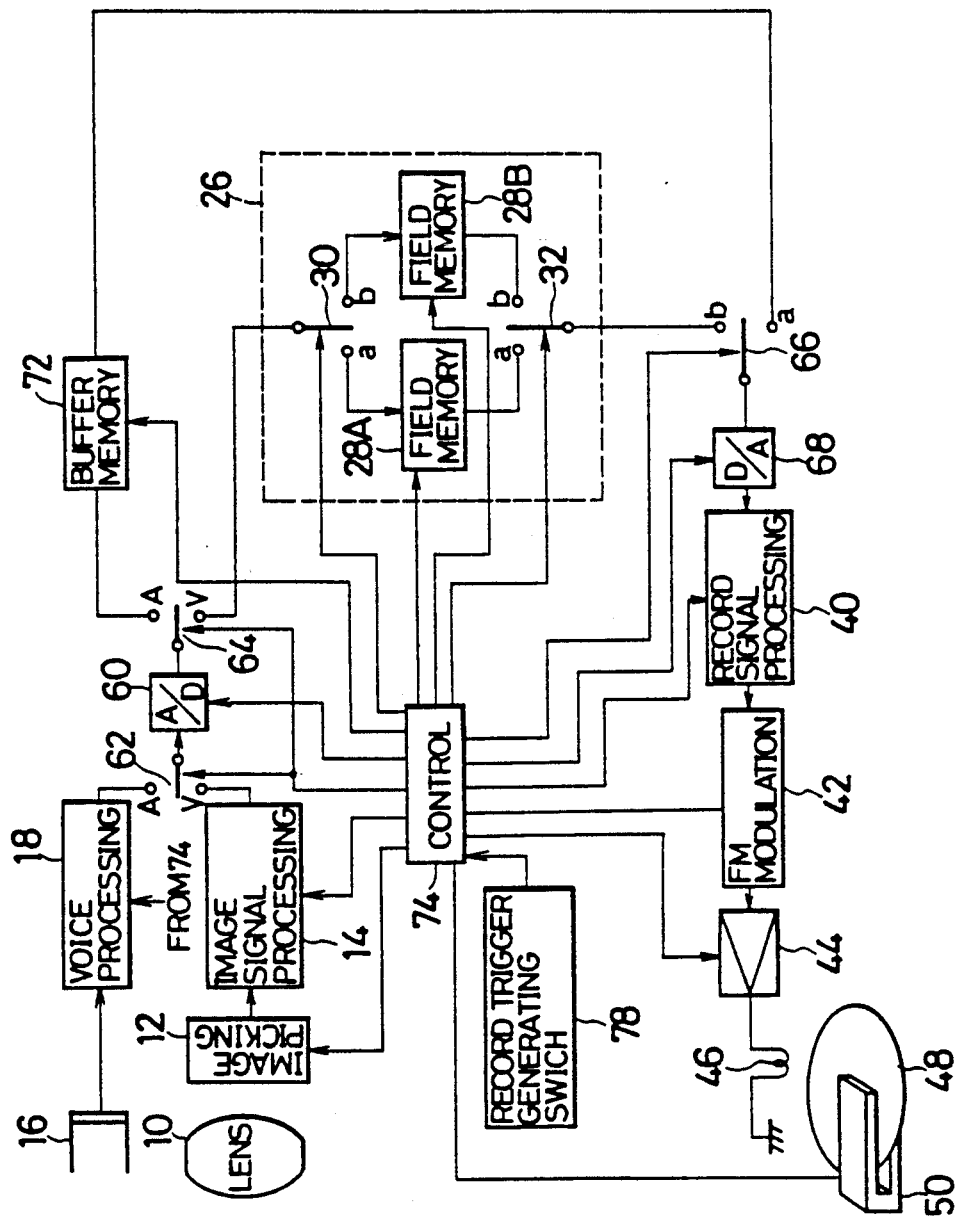

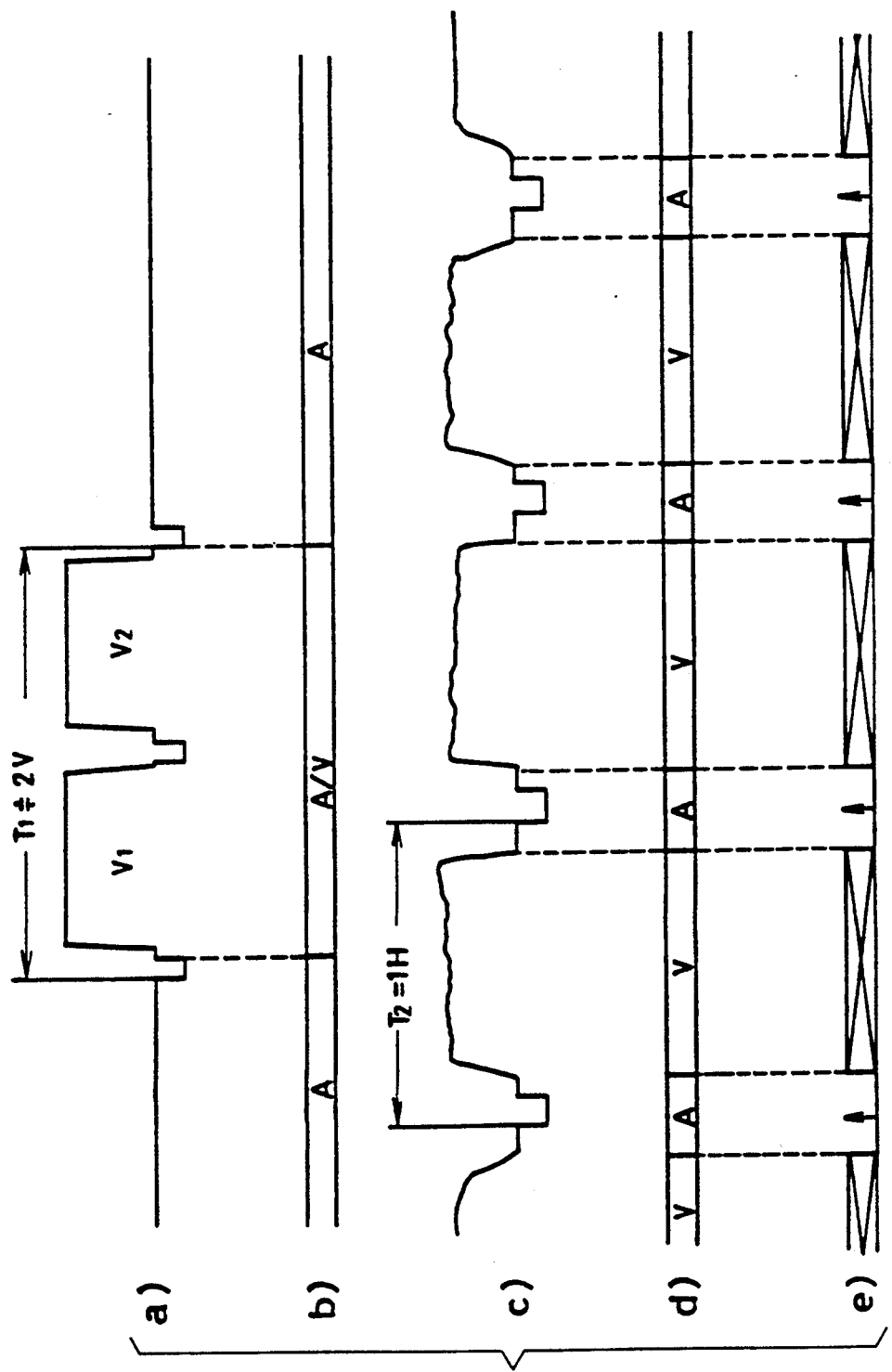

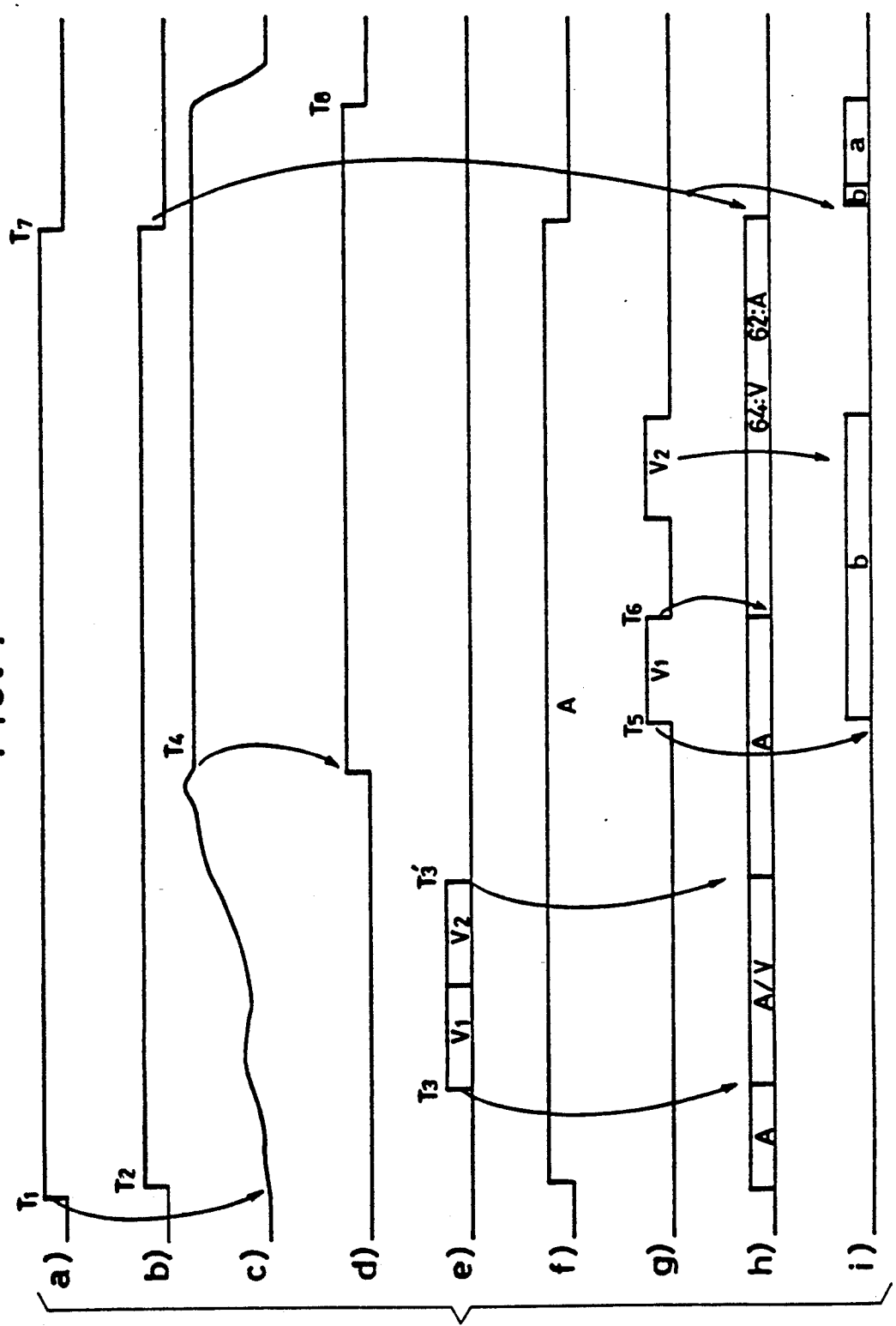

INFORMATION PROCESSING APPARATUS HAVING A COMMON A/D CONVERTER FOR THE IMAGE AND AUDIO SIGNALS

BACKGROUND OF THE INVENTION

1. Field of the Invention

The present invention relates to an information processing apparatus for processing an image signal and a voice (audio) signal.

2. Related Background Art

Hitherto, as an apparatus for processing an image signal and a voice signal, there have been known a first type of apparatus for processing both of the image signal and the voice signal in an analog manner, a second type of apparatus for digitally processing either one of the image signal and the voice signal and for processing the other in an analog manner, and a third type of apparatus for digitally processing both of the image signal and the voice signal. In the third type of apparatus, it is necessary to A/D convert both the voice signal and the image signal. However, in the conventional apparatus, a predetermined analog process is individually executed to the voice input and image input and those signals are respectively A/D converted by separate A/D converters and are written into dedicated memories.

However, in the above conventional apparatus, to process both of the voice and the image signals, A/D conversion and D/A conversion are executed in a voice processing system and an image processing system by sampling clocks having different frequencies. Thus, there are drawbacks such that the A/D conversion and D/A conversion of two systems are necessary, the circuit scale increases, and the costs rise.

On the other hand, there has been known an electronic still camera as an example of a conventional apparatus for recording an image signal or a voice signal onto a recording medium.

In such a camera, a magnetic disk called a still video floppy is rotated to thereby enable the image signal or voice signal to be recorded.

When rotating such a magnetic disk, a time until the rotation rises to a predetermined state cannot be ignored. Therefore, hitherto, there has been proposed a method whereby the voice signal which is generated in such a time is temporarily stored in a memory and after the rotation rises to a predetermined state, the voice signal stored in the memory is recorded onto the magnetic disk.

However, there is still room for improvement in the conventional method from a viewpoint of its construction.

SUMMARY OF THE INVENTION

It is an object of the present invention to provide an information processing apparatus which can process an image signal and a voice signal by a simpler construction.

Another object of the invention is to provide an apparatus in which an image signal and a voice signal which are given as analog signals can be processed as digital signals by a simpler construction.

Under such objects, according to a preferred embodiment of the invention, there is disclosed an apparatus having A/D converting means for A/D converting an image signal in an effective period of the image signal and for A/D converting a voice signal in a predetermined period other than the effective period, wherein an image signal and a voice signal can be A/D converted by signal A/D converting means and the circuit construction can be simplified.

Still another object of the invention is to provide an apparatus in which a voice signal and an image signal can be stored by a simpler construction.

Under such objects, according to a preferred embodiment of the invention there is disclosed a recording apparatus comprising a frame memory for temporarily storing a frame image signal and a voice memory for temporarily storing a voice signal, wherein an image and a voice are recorded onto a recording medium, and an unused memory portion in the frame memory is used to temporarily store the voice signal.

Another object of the invention is to provide a novel recording apparatus which can record both of a still image signal and a voice signal.

The above and other objects and features of the present invention will become apparent from the following detailed description and the appended claims with reference to the accompanying drawings.

BRIEF DESCRIPTION OF THE DRAWINGS

FIG. 2 is a block diagram of the second embodiment of the invention;

FIG. 3 is a timing chart for explaining the operation of the embodiment shown in FIG. 1; and FIG. 4 is a timing chart for explaining the operation of the embodiment shown in FIG. 2.

DETAILED DESCRIPTION OF THE PREFERRED EMBODIMENTS

Figure 1:
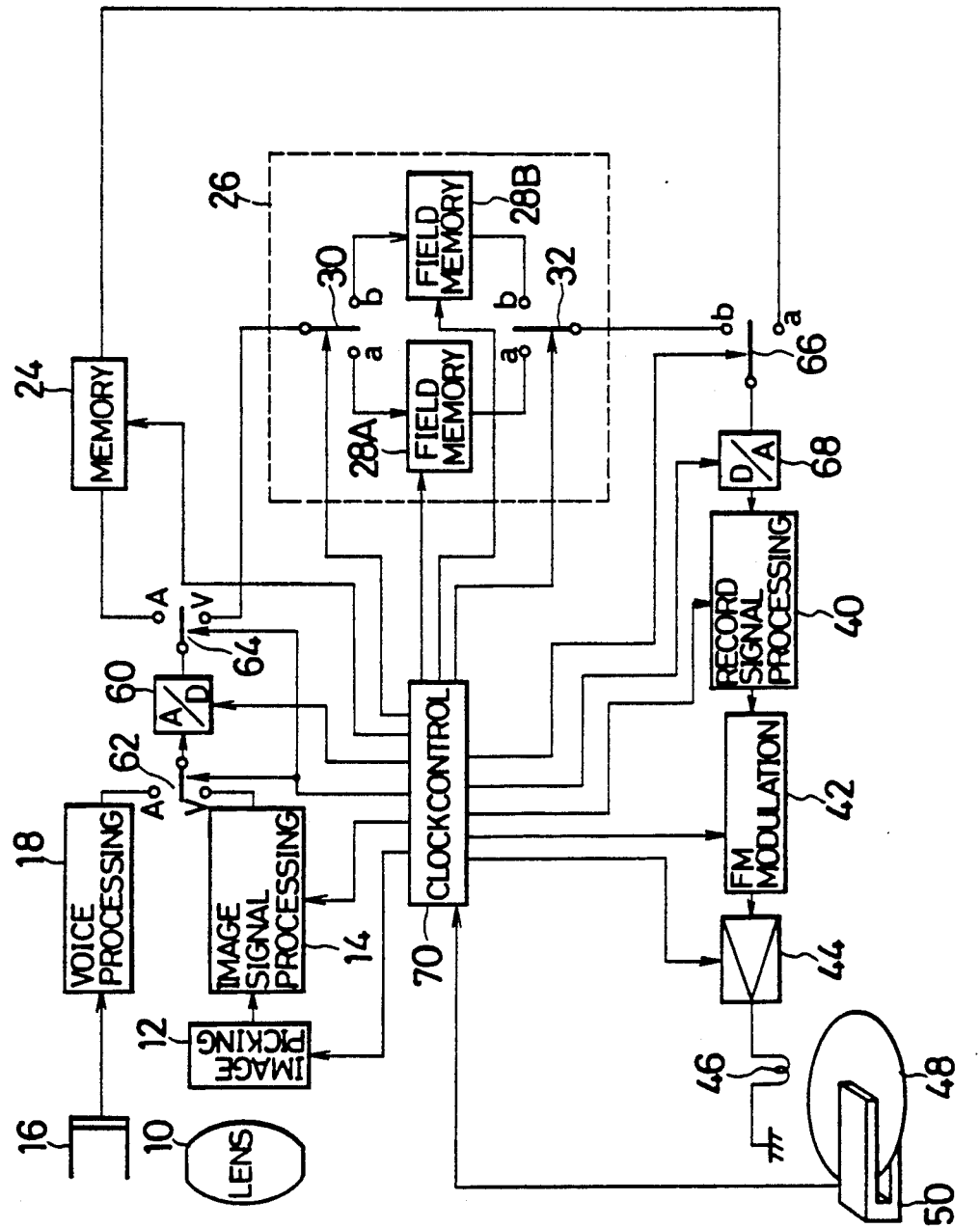
FIG. 1 is a block diagram of an embodiment of the present invention.

FIG. 1 is a block diagram of an embodiment of the present invention. Reference numeral 10 denotes a photographing lens; 12 indicates an image pickup element for converting an optical image obtained by the lens 10 into an electric signal; 14 is an image signal processing circuit for executing well-known image signal processes such as gamma correction, addition of sync signals, and the like to an output of the image pickup element 12; 16 is a microphone; 18 is a voice processing circuit; 24 is a memory for a voice signal; and 26 is a frame memory for an image signal. In the frame memory 26, reference numerals A and 28B denote field memories; 30 indicates a write field change-over switch; and 32 is a read field change-over switch. Reference numeral 40 indicates a record signal processing circuit; 42 represents an FM modulation circuit; 44 is a recording amplifier; 46 is a recording head; 48 is a magnetic disk; and 50 is a disk drive apparatus.

Reference numeral 60 denotes an A/D converter for digitizing an analog output of the voice processing circuit 18 or image signal processing circuit 14; 62 and 64 indicate voice/image change-over switches; 66 is a switch to select either one of an output of the voice memory 24 and an output of the frame memory 26; 68 is a D/A converter for converting a digital signal selected by the switch 66 into an analog signal; and 70 is a clock control circuit to control the operating timing in each section in a manner which will be explained hereinafter. That is, by the clock control circuit 70, the switches 62 and 64 are connected to the V side for an ordinary video period and are connected to the A side for a horizontal blanking period and a period other than the video period. On the other hand, sampling clocks of an ordinary frequency for A/D converting the image signal are supplied to the A/D converter 60 in the video period. Sampling clocks having the same frequency as the horizontal synchronizing frequency are supplied to the A/D converter 60 for the horizontal blanking period and a period other than the video period. In the case of the voice signal, the frequency of the sampling clocks which are supplied to the D/A converter 68 is set to a speed which is similar to or higher than that in the case of the image signal. Due to this, the voice signal is time base compressed.

The whole operation of FIG. 1 will now be described. The image pickup element 12 converts the optical image obtained by the photographing lens into an electric signal. The output signal of the image pickup element 12 is subjected to well-known processes in the image signal processing circuit 14 and becomes the image signal. The image signal is then converted into a digital signal by the A/D converter 62 as mentioned above and is stored in the field memories 28A and 28B in the frame memory 26 every field. When the rotation of the magnetic disk 48 by the disk drive apparatus 50 is stabilized, the signal stored in the frame memory 26 is read out and supplied to the D/A converter 68 through an switch 66 and is returned to the analog signal. The analog signal is supplied to the record signal processing circuit 40. After the analog signal is record processed by the record signal processing circuit 40, it is frequency modulated by the FM modulation circuit 42 and is supplied to the recording head 46 through the recording amplifier 44 and is recorded onto the magnetic disk 48.

On the other hand, the voice signal output of the microphone 16 is subjected to an amplifying process and the like by the voice processing circuit 18 and, thereafter, it is converted into a digital signal by the A/D converter 60, as will be explained hereinlater. A frequency of clocks which are supplied from a clock control circuit 70 to the A/D converter 60 at this time is lower than that of the clocks in the case of A/D converting the image signal. The output of the A/D converter 60 is stored in the voice memory 24 through the switch 64.

FIG. 3 shows the timings for the A/D converting operations of the image signal and voice signal.

In FIG. 3, a) denotes an image signal which is output from the image signal processing circuit 14 and b) indicates switching states of the switches 62 and 64. $V_1$ and $V_2$ shown in a) denote image signals of one field which are stored into the field memories 28A and 28B, respectively. "A" shown in b) indicates that the switches 62 and 64 are switched to the side A, and "A/V" denotes that the switches 62 and 64 are alternately switched to the sides A and B at a predetermined period.

As shown in a) and b) in FIG. 3, the switches 62 and 64 are switched to the side A for the period of time other than the time when the image signal is output. The A/D converted voice signal is stored in the memory 24.

The timings in the alternate switching period of time of A/V shown in b) in FIG. 3 are shown in c), d) and e) in FIG. 3. c) indicates an output state of the image signal, d) indicates switching states of the switches 62 and 64, and e) represents a timing for the sampling, that is, A/D conversion of the input signal by the A/D converter 60. In c), d) and e) one horizontal scan period is shown by $T_2$. As will be also obvious from c), d) and e) in FIG. 3, for an interval when the image signal is output from the image signal processing circuit 14, the switches 62 and 64 are switched to the side A for the H blanking period and are switched to the side V in the other period of time. The A/D converter 60 is controlled by the clock control circuit 70 in a manner such that the input signal is sampled once every time the switch 62 is switched to the side A (in the embodiment, at a period of 15.75 kHz) and, in the other cases, the image signal is sampled at a high speed, for instance, at a frequency of $3f_{sc}$ or $4f_{sc}$ if the image signal has been modulated by the subcarrier of a frequency $f_{sc}$.

At the timings shown in c), d) and e) in FIG. 3, the A/D conversion timing speeds of the A/D converter 60 have been changed for the H blankng period of the input image signal and for the other period of time. However, it is also possible to construct the circuit in a manner such that the A/D conversion timing of the A/D converter 60 is held at a high speed and the timing for writing into the memory 24, for instance, the frequency of a write enable signal of the memory 24, can be also set to be slower, namely, lower than the A/D conversion timing of the A/D converter 60.

For the memory signal written in the field memories 28A and 28B or memory 24 as mentioned above, the image signal is first recorded onto the magnetic disk 48 and, thereafter, the voice signal in the memory 24 is read out and is supplied to the D/A converter 68 through the switch 66 and is converted into the analog signal. The output of the D/A converter 68 is supplied to the record signal processing circuit 40. Thereafter, the processes are executed in a manner similar to the case of the image and the processed signal is recorded onto the magnetic disk 48 by the magnetic head 46.

As a switching timing of the switch 66, after the rotation of the magnetic disk 48 was stabilized, the switch 66 is connected to the side b and the memory signal in the frame memory 26 is read out and is supplied to the D/A converter 68 through the switch 66. The image signal is recorded onto the magnetic disk 48. Next, the switch 66 is connected to the side a and the memory signal in the voice memory 24 is read out and is recorded onto the magnetic disk 48 in a manner similar to that discussed above.

FIG. 2 shows a constructional block diagram of another embodiment of the invention, in which the same parts and elements as those shown in FIG. 1 are designated by the same reference numerals. Reference numeral 72 denotes a voice buffer memory having at least a capacity large enough to store the digital signal which was obtained by A/D converting the voice signal by the horizontal sync frequency for only the total time interval of the time until the rotation of the magnetic disk 48 is stabilized and the time to magnetically record the image signal of one field onto the magnetic disk 48. Reference numeral 74 denotes a control circuit to control the operation timing in each section of the circuit as will be explained hereinafter. Reference numeral 78 indicates a switch to generate a record trigger. The switch 78 is constructed as a two-stage switch. When the first stage of the switch 78 is turned on, the operation of the disk drive apparatus 50 is started. When the second stage of the switch 78 is truned on, the image pickup operation is started.

The apparatus operates in a manner similar to the embodiment of FIG. 1 until the rotation of the magnetic disk 48 rises. The buffer memory 72 stores the voice signal for such a period of time. When the rotation rises, the memory signal in the field memory 28A in the frame memory 26 is read out and is supplied to the D/A converter 68 through the switch 66 and is recorded onto the magnetic disk 48 by the magnetic head 46 through the D/A converter 68, record signal processing circuit 40, FM modulation circuit 42, and recording amplifier 44. The voice signal for this period of time is also similarly stored in the buffer memory 72. After that, the image signal of the second field is read out of the field memory 28B and is similarly recorded onto the magnetic disk 48.

For the period of time when the image signal of the second field is magnetically recorded onto the magnetic disk 48, the switch 64 is connected to the side V and the switch 30 is connected to the a contact side. Thus, the voice signal for this period of time is stored in the field memory 28A. After completion of the recording of the image signal of the second field, the voice signal is then recorded. First, the switch 66 is connected to the side a. The memory signal in the buffer memory 72 is read out and is recorded onto the magnetic disk 48 by the circuits and elements 68, 40, 42, 44, and 46. Next, the switch 66 is connected to the side b and the switch 32 is connected to the a contact side. The memory signal (voice) in the field memory 28A is read out and recorded onto the magnetic disk 48 by the circuits and elements 68, 40, 42, 44, and 46.

The above operations will now be described with reference to a timing chart shown in FIG. 4. In FIG. 4, a) indicates the depression of the first stage of the record trigger generating switch 78;
b) indicates the depression of the second stage of the switch 78;
c) indicates the driving state of the disk drive apparatus 50;
d) indicates the timing when the driving of the disk drive apparatus 50 rises to a predetermined state;
e) indicates the image signal of one frame of two fields which is output from the image signal processing circuit 14;
f) indicates the voice signal which is output from the voice signal processing circuit 18;
g) indicates the image signal which is read out of the memories 28A and 28B;
h) indicates the switching states of the switches 62 and 64; and
i) indicates the switching state of the switch 66.

First, when the switch 78 is depressed to the first stage at the timing shown by $T_1$, the disk drive apparatus 50 starts driving as shown in c). When the switch 78 is depressed to the second state (timing $T_2$) before the disk drive apparatus 50 rises at the timing $T_4$, the image pickup element 12 operates and the image signal is output (for a period of time $T_3$ to $T_3'$) at the timings as shown by $V_1$ and $V_2$ in e). On the other hand, when the switch 78 is depressed to the first stage at the timing $T_1$, the voice signal is output from the microphone 16 and voice signal processing circuit 18 as shown in f). Before $T_3$, as shown in h), both of the switches 62 and 64 have been switched to the side A and the voice signal which is output from the circuit 18 is A/D converted by the A/D converter 60 and written into the buffer memory 72. For the period of time between $T_3$ and $T_3'$ mentioned above, in a manner similar to that described above with respect to in FIG. 3, the switches 62 and 64 are alternately switched at a predetermined period and the voice signal and image signal are written into the memory 72 and field memories 28A and 28B.

Next, when the drive apparatus 50 rises at the timing $T_4$, the drive apparatus 50 outputs a leading signal shown in d) to the control circuit 74. Thus, the control circuit 74 switches the switch 68 to the side b as shown in i) and starts the reading of the image signal from the field memories 28A and 28B at the timing $V_1$ and $V_2$ shown in g).

After completion of the reading from the field memories 28A (timing $T_6$), the control circuit 74 keeps the switch 62 in the connecting state on the side A and connects only the switch 64 to the side V and connects the switch 30 to the side a, thereby allowing the voice signal to be written into the field memory 28A.

The image signal is read out of the field memory 28B at the timing shown by $V_2$ in g) through the D/A converter 68 and the like and is recorded onto the disk 48. After completion of the recording of the image signal, the head 46 is moved over the disk 48 and accesses the next unrecorded track.

When the depression of the switch 78 is then released (timing $T_7$), as shown in f) and h), the writing of the voice signal in the memory is stopped. The voice signals written in the memories 72 and 28A are then read out and written onto the disk 48.

As mentioned above, in the embodiment, since the voice signal is written in the field memories to store the image signal which is obtained from the image pickup element 12, the voice signal and image signal can be processed using a small memory capacity.

Further, in the embodiment, both of the voice and image signals can be converted into digital signals by one A/D converter 60, and both of the frame image and voice signals can be recorded onto the magnetic disk using a small memory capacity.

In the embodiment, a CCD image pickup element has been used as image means, and a microphone has been used as voice input means. However, the invention is not limited to such devices. Further, although the invention has been described with respect to an electronic still camera as an example, the invention is not limited to such a camera but can be also applied to other various apparatuses such as an apparatus having no image pickup means. Moreover, the invention can be also applied to an apparatus such that the give image signal and the voice signal are not recorded, but transmitted to another apparatus.

A recording medium is also not limited to the magnetic disk but a tape-shaped medium or an optical disk can be used. For instance, a solid state memory such as a semiconductor memory can be used.

As will be easily understood from the above description, according to the embodiments, the memory construction a voice and an image signals, and the A/D and D/A conversion processing systems can be greatly simplified. The size and costs of the apparatus can be reduced.

I claim:

1. An information processing apparatus comprising:
  a) first means for supplying an image signal during an effective period and an ineffective period, and an audio signal;
  b) common A/D converting means for A/D converting both said image signal and said audio signal;
  c) second means for supplying said image signal to said A/D converting means during said effective period and for supplying said audio signal to the A/D converting means during said ineffective period; and
  d) memory means for storing the signal which was A/D converted by said A/D converting means.

2. An apparatus according to claim 1, wherein said image signal is a signal in which the effective period and the ineffective period are alternately repeated every horizontal period.

3. An apparatus according to claim 1, wherein said memory means comprises a field memory.

4. An apparatus according to claim 1, further comprising:
   image pickup means for converting an object image into said image signal.

5. An apparatus according to claim 1, further comprising:
   a microphone for converting sound into said audio signal.

6. An information processing apparatus comprising:
   first means for supplying an image signal during an effective period and an ineffective period, and an audio signal;
   common A/D converting means for A/D converting both said image signal and said audio signal, said A/D converting means having different converting frequencies for when said image signal is A/D converted and when said audio signal is A/D converted;
   second means for supplying said image signal to said A/D converting means during said effective period, and for supplying said audio signal to said A/D converting means during said ineffective period.

7. An apparatus according to claim 6, wherein said image signal comprises a signal in which the effective period and the ineffective period are alternately repeated every horizontal period.

8. An apparatus according to claim 6, further comprising:
   memory means for storing the signal which was A/D converted by said A/D converting means.

9. An apparatus according to claim 6, wherein said memory means comprises a field memory.

10. An apparatus according to claim 6, further comprising:
    image pick means for converting an object image into said image signal.

11. An apparatus according to claim 6, further comprising:
    a microphone for converting sound into said audio signal.

12. An apparatus comprising:
   a) image pickup means for converting an object image into an image signal;
   b) a microphone for converting sound into an audio signal;
   c) common A/D converting means for A/D converting both said audio signal and said image signal, said A/D converting means time sharingly A/D converting the image signal and the audio signal during a period of time in which the image signal is provided from said image pickup means; and
   d) memory means for storing the digital signal which was obtained by the A/D conversion by the A/D converting means.

13. An information processing apparatus comprising:
   a) first means for supplying an image signal during an effective period and an ineffective period, and another signal other than said image signal;
   b) common converting means for converting both said image signal and said another signal, said image signal being converted at a different frequency than said another signal; and
   c) second means for supplying said image signal to said converting means for said effective period and for supplying said another signal to the converting means for said ineffective period.

14. An apparatus according to claim 13, further comprising:
    memory means for storing the signal which was A/D converted by said common converting means.

15. An apparatus according to claim 13, wherein said memory means comprises a field memory.

* * * * *

UNITED STATES PATENT AND TRADEMARK OFFICE
CERTIFICATE OF CORRECTION

PATENT NO. : 5,063,447

DATED : November 5, 1991

INVENTOR(S) : Nobuhiro TAKEDA

It is certified that error appears in the above-identified patent and that said Letters Patent is hereby corrected as shown below:

Title page
[56] References Cited:
U.S. PATENT DOCUMENTS

"Noska et al." should read --Noske et al.--.

Item [57] ABSTRACT, line 12,
    "effective" should read --ineffective--.

Sheet 2 of drawing, Fig. 2:
    "SWICH" should read --SWITCH--.

COLUMN 2:
    Line 47, "A" should read --28A--.

COLUMN 3:
    Line 19, "converter 62" should read --converter 60--; and
    Line 25, "an" should read --a--.

COLUMN 4:
    Line 13, "blankng" should read --blanking--;
    Line 31, "image" should read --image signal--; and
    Line 61, "truned" should read --turned--.

COLUMN 5:
    Line 63, "in" should be deleted.

UNITED STATES PATENT AND TRADEMARK OFFICE
CERTIFICATE OF CORRECTION

PATENT NO.  : 5,063,447

DATED       : November 5, 1991

INVENTOR(S) : Nobuhiro TAKEDA

It is certified that error appears in the above-identified patent and that said Letters Patent is hereby corrected as shown below:

COLUMN 6:
    Line 4, "timing" should read --timings--;
    Line 42, "give" should read --given--; and
    Line 51, "a" should read --of-- and "an" should be deleted.

COLUMN 7:

Line 25, "verted;" should read --verted; and--.

COLUMN 8:
    Line 3, "pick" should read --pickup--.

Signed and Sealed this

Twenty-second Day of June, 1993

Attest:

MICHAEL K. KIRK

*Attesting Officer*      *Acting Commissioner of Patents and Trademarks*